United States Patent [19]

Lönne et al.

[11] Patent Number: 4,600,201
[45] Date of Patent: Jul. 15, 1986

[54] IMPREGNATED FLAT SEALING GASKET AND METHOD OF MAKING THE SAME

[75] Inventors: Klaus Lönne; Klaus-Peter Majewski; Hans-Rainer Zerfass, all of Burscheid, Fed. Rep. of Germany

[73] Assignee: Goetze AG, Burscheid, Fed. Rep. of Germany

[21] Appl. No.: 709,289

[22] Filed: Mar. 7, 1985

[30] Foreign Application Priority Data

Mar. 9, 1984 [DE] Fed. Rep. of Germany ....... 3408596

[51] Int. Cl.[4] .................. F16J 15/10; B32B 31/12; B32B 31/26
[52] U.S. Cl. ........................................ 277/1; 277/228; 277/235 B; 277/DIG. 6; 264/137; 427/372.2; 427/385.5
[58] Field of Search ................ 277/227, 228, 235 R, 277/235 B, DIG. 6, 1; 264/134–137; 427/372.2, 385.5

[56] References Cited

U.S. PATENT DOCUMENTS

| Re. 29,375 | 8/1977 | Thiele | 427/372.2 X |
|---|---|---|---|
| 3,970,322 | 7/1976 | Stecher et al. | 277/235 B X |
| 4,201,804 | 5/1980 | Stecher et al. | 277/235 B X |
| 4,317,575 | 3/1982 | Cavicchio | 277/227 |

FOREIGN PATENT DOCUMENTS

| 1212839 | 11/1970 | United Kingdom | 277/235 B |
|---|---|---|---|
| 2051975 | 1/1981 | United Kingdom | 277/235 B |

*Primary Examiner*—Robert S. Ward
*Attorney, Agent, or Firm*—Spencer & Frank

[57] ABSTRACT

A method of making a flat gasket comprising a nonwoven mat having opposite faces, including the steps of impregnating the mat with a polymerizable liquid impregnating agent and applying to at least one part of at least one mat face a coating containing a polymerizable polymer material. The coating is applied to the impregnated mat prior to polymerization of the impregnating agent. The impregnating agent and the coating are simultaneously polymerized in one operation.

13 Claims, No Drawings

IMPREGNATED FLAT SEALING GASKET AND METHOD OF MAKING THE SAME

BACKGROUND OF THE INVENTION

This invention relates to a flat sealing gasket made of soft material, particularly a cylinder head gasket for internal combustion engines and is of the type which has an impregnated and, on occasion, metal-reinforced nonwoven mat provided unilaterally or bilaterally on the entire mat face or a part thereof, with a polymer coating containing, according to requirements, dissolved, suspended or dispersed liquid or solid additives.

Cylinder head gaskets made of a soft material preferably comprise nonwoven fabric mats which may be metal-reinforced. Frequently, such gaskets are, mostly for improving their strength, sealing properties and service life, impregnated with synthetic polymerizable liquids in such a manner—as disclosed, for example, in U.S. Pat. No. 3,970,322 issued July 20, 1976—that the impregnating material fills the pores of the soft material generally to approximately 60% to 90% and further, the impregnating material is in most cases thermally polymerized in the finished gasket mat.

By virtue of the polymerized impregnating agent the cylinder head gasket becomes relatively rigid and thus resists deformations to adapt it to the sealing faces of the engine block in a satisfactory manner upon installation. For eliminating this disadvantage, it has been known to provide the gasket, on one side or on both sides, on its entire surface or on one part thereof, with a preferably elastic polymer coating to improve the microseal and macroseal properties. Further, impregnated cylinder head gaskets without such coating may, during engine service, tend to adhere to the sealing face of the engine block or the cylinder head or the polymerized impregnating material in the gasket may, after a longer storage and under the effect of light, air or ozone, change and thus become brittle or may even soften. Thus, the coating provided on the gasket face or faces contains, dissolved, suspended and/or dispersed therein, substances which oppose the adhesion tendency as well as substances which protect the gasket from aging, light and/or ozone. Similarly, the coatings on the cylinder head gaskets may contain substances which, dependent upon requirements, increase or decrease sliding properties and are, in most instances, fine grained or powdery substances.

In order to sufficiently dissolve and/or bind the generally solid, powdery or fine grained additives in the coating material, it has been necessary that the polymer material of the coating be present in large quantities relative to the additives. In order to achieve that the coatings result in all the improvements which are desired of the additives, the gasket faces had to be provided with relatively thick coatings. Thick coatings, however, require a greater quantity of the usually expensive polymer material, they dry only with difficulty and are furthermore difficult to polymerize. Also, they require additional process steps and applicator devices which render the manufacture of the gaskets more expensive. The relatively thick coatings are destroyed more easily during the operation of the engine and further, they occasionally adversely affect the behavior of the seal.

In addition, good adherence of the coatings on the gasket faces is required. Impregnated gaskets, however, with a high degree of pore fill of the polymerized impregnating agent have a relatively smooth and hard surface so that an anchoring of the coatings on the soft material involves difficulties. A roughening of the soft material to enhance the adherence of the coating cannot be considered and a use of adhesives would, in turn, make the manufacture of the gasket significantly more expensive.

DESCRIPTION OF THE INVENTION

It is an object of the invention to provide an improved impregnated flat gasket from which the discussed disadvantages are eliminated and which is simple and inexpensive to manufacture.

This object and others to become apparent as the specification progresses, are accomplished by the invention, according to which, briefly stated, the coating is applied to the surface of the impregnated gasket prior to the polymerization of the impregnating material and the coating is polymerized, together with the impregnating agent, in one process step. Preferably, the polymer component of the coating is constituted exclusively by the impregnating material of the gasket. In principle, however, it is feasible to provide that the coating has, in addition to the impregnating agent used for the gasket, another polymerizable polymer in a proportion of 50 to 100% by weight, mixed with the impregnating agent.

The additives which are dissolved, suspended and/or dispersed in the polymer coating are preferably additives known in the polymer chemistry and are present in quantities from 0.5 to 10% and are preferably anti-aging agents, as well as agents protecting against light and ozone, polymerizing agents such as preferably peroxide, auxiliary polymerizing agents such as metallurgic compounds acting as polymerizing catalysts or softeners, having a basis of principally temperature resistant octyl phtalates.

Solid, fine-grained substances which are dispersed and bound in the coating are present preferably in a quantity of 5 to 50% by weight and serve principally for lowering the adhesion tendency and the coefficient of friction of the gasket, for reinforcing the coating or, on occasion, for increasing the frictional coefficient of the gasket. Additives which lower the adhesion tendency and the friction coefficient of the gasket are preferably fine grained or powdery polytetrafluorethylene, talc, kaolin, molybdenum disulfide, boron nitride, graphite or metal powder. Substances which increase the frictional coefficient of the gasket are preferably powdery or fine grained sand, corundum, mica or sharp-edged glass beads. Additives which increase the strength of the coating may be the usual filler materials known in the polymer chemistry, such as preferably powdery or fine grained kieselgur, diatomaceous earth, bentonite or, occasionally fine-fiber inorganic or organic materials.

As a first manufacturing step according to the invention, the gasket mat is impregnated with an unpolymerized liquid material, for example, by immersing the gasket in a bath of 100 parts of polybutadiene and 12 parts of mineral oil as filler, as described in U.S. Pat. No. 3,970,322. Immediately thereafter the gasket is provided with a coating by means of immersion, spraying or rolling with the coating material on one or on both sides. Thereafter, the coating and the impregnating agent are simultaneously polymerized, preferably by heat treatment in a furnace.

It has been found that the solid or liquid additives may be applied directly to the gasket immediately after the impregnation thereof. The impregnating agent present in the surface region of the gasket then constitutes the coating material which, being in a liquid and non-polymerized state, flows around and over the additives and envelopes them and thus firmly binds them subsequent to polymerization. For the manufacture of partial coatings the coating material may be applied by means of a template and/or by a screen printing method.

By applying the coating materials according to the invention to the unpolymerized gasket faces which contain the unpolymerized impregnating agent, the impregnating agent may mix with the coating materials in the boundary surface zones of the gasket, so that after the polymerization there is obtained a firm bond and thus a firm adhesion by means of a chemical bonding between the polymers of the impregnating agent and the polymer coating material. It has been found that when using the impregnating agent also as the coating material, there is obtained a particularly firm bond between the coating and the gasket. The additives in the coating may, as auxiliary polymerizing agents, improve the properties of the coatings primarily by means of setting a definite hardness, elasticity, plasticity and service life with respect to the sealing media to such an extent that relatively inexpensive polymer components are equivalent to expensive polymer materials which therefore may be dispensed with in the coating.

By virtue of the fact that solid and liquid components of the coating are bound in the surface regions also by the liquid and non-polymerized impregnating material, in the coating no polymer material is needed and to obtain the same effect, it is sufficient to apply relatively thin coatings to the gasket faces. The application of the solid-to-liquid additives without a polymer binder to the gasket directly after impregnation is, however, feasible only for certain modes of use.

While the invention finds particularly advantageous application in cylinder head gaskets, it is to be understood that the invention may be utilized in other flat gaskets as well. In engine structures, such flat gaskets may be exhaust flange seals, oil casing seals or carburetor seals.

It will be understood that the above description of the present invention is susceptible to various modifications, changes and adaptations, and the same are intended to be comprehended within the meaning and range of equivalents of the appended claims.

What is claimed is:

1. In a method of making a flat gasket comprising a non-woven mat having opposite faces, including the steps of impregnating the mat with a polymerizable liquid impregnating agent, applying to at least one part of at least one mat face a coating containing a polymerizable polymer material, the improvement wherein the coating is applied to the impregnated mat prior to polymerization of the impregnating agent and simultaneously polymerizing the impregnating agent and the coating in one operation.

2. A method as defined in claim 1, wherein said coating has a polymer component consisting exclusively of said impregnating agent.

3. A method as defined in claim 1, wherein said coating has a polymer component comprising 50 to 100% by weight of a polymerizable polymer and 0 to 50% by weight of said impregnating agent mixed with said polymerizable polymer.

4. A method as defined in claim 1, wherein said coating includes 0.5 to 10% by weight of at least one auxiliary material selected from the group consisting of anit-aging agents, anti-ozone agents, polymerizing agents, polymerizing catalysts and softeners.

5. A method as defined in claim 1, wherein said coating includes 5 to 50% by weight of at least one substance selected from the group consisting of substances reducing the frictional coefficient of the coating, reducing tackiness of the coating, increasing the strength of the coating and increasing the frictional coefficient of the coating.

6. A method as defined in claim 1, wherein the step of applying the coating includes the step of applying the coating by a pattern printing process.

7. A method as defined in claim 1, wherein the step of applying the coating includes the step of applying the coating by a screen printing process.

8. A method as defined in claim 5, wherein said selected substances are applied to the gasket mat prior to polymerization of said impregnating agent, whereby the unpolymerized impregnating agent binds the substances and subsequent to polymerization the impregnating agent forms a coating with said substances in a surface zone of said gasket mat.

9. In a flat gasket including a non-woven mat having opposite faces, said mat including a polymerized impregnating agent, a coating including a polymerized polymer component covering at least one part of at least one mat face, the improvement wherein said polymerized polymer includes, at least in part, said polymerized impregnating agent.

10. A flat gasket as defined in claim 9, wherein said polymer component consists exclusively of said impregnating agent.

11. A flat gasket as defined in claim 9, wherein said polymer component comprises 50 to 100% by weight of a polymerizable polymer and 0 to 50% by weight of said impregnating agent mixed with said polymerizable polymer.

12. A flat gasket as defined in claim 9, wherein said coating includes 0.5 to 10% by weight of at least one auxiiliary material selected from the group consisting of anti-aging agents, anti-ozone agents, polymerizing agents, polymerizing catalysts and softeners.

13. A flat gasket as defined in claim 9, wherein said coating includes 5 to 50% by weight of at least one substance selected from the group consisting of substances reducing the frictional coefficient of the coating, reducing tackiness of the coating, increasing the strength of the coating and increasing the frictional coefficient of the coating.

* * * * *